(12) United States Patent
Walker et al.

(10) Patent No.: US 9,568,112 B2
(45) Date of Patent: Feb. 14, 2017

(54) FLOW CONTROL DEVICE

(71) Applicant: WALKER FILTRATION LTD, Washington, Tyne & Wear (GB)

(72) Inventors: Brian Walker, Washington (GB); Simon Wise, Houghton-le-Spring (GB); Peter Carney, Sunderland (GB)

(73) Assignee: WALKER FILTRATION LTD, Tyne & Wear (GB)

( * ) Notice: Subject to any disclaimer, the term of this patent is extended or adjusted under 35 U.S.C. 154(b) by 5 days.

(21) Appl. No.: 14/729,759

(22) Filed: Jun. 3, 2015

(65) Prior Publication Data

US 2015/0362082 A1 Dec. 17, 2015

(30) Foreign Application Priority Data

Jun. 11, 2014 (GB) .................................. 1410359.2

(51) Int. Cl.
| | | |
|---|---|---|
| *F16K 3/08* | (2006.01) | |
| *F16K 11/074* | (2006.01) | |
| *B01D 53/04* | (2006.01) | |
| *B01D 53/26* | (2006.01) | |
| *B01D 53/047* | (2006.01) | |

(52) U.S. Cl.
CPC ............ *F16K 3/08* (2013.01); *B01D 53/0446* (2013.01); *F16K 3/085* (2013.01); *F16K 11/074* (2013.01); *B01D 53/047* (2013.01); *B01D 53/26* (2013.01); *B01D 2259/40003* (2013.01); *B01D 2259/40005* (2013.01); *B01D 2259/40043* (2013.01)

(58) Field of Classification Search
CPC ... B01D 53/047; B01D 53/0446; B01D 53/26; B01D 2259/4043; B01D 2259/40003; B01D 2259/40005; F16K 3/08; F16K 3/085; F16K 11/074
USPC .............................................. 96/121; 251/206
See application file for complete search history.

(56) References Cited

U.S. PATENT DOCUMENTS

| | | | |
|---|---|---|---|
| 934,932 A | | 9/1909 | Osbourn |
| 935,329 A | | 9/1909 | Serrell |
| 3,464,186 A | * | 9/1969 | Walker .................... B01D 53/26 55/457 |
| 4,360,040 A | * | 11/1982 | Cove .......................... F16K 3/34 137/625.3 |
| 4,983,190 A | * | 1/1991 | Verrando ............... B01D 53/02 95/11 |

(Continued)

FOREIGN PATENT DOCUMENTS

| | | |
|---|---|---|
| EP | 0076451 A1 | 4/1983 |
| EP | 1351008 A1 | 10/2003 |

(Continued)

*Primary Examiner* — Frank Lawrence
(74) *Attorney, Agent, or Firm* — Egbert Law Offices, PLLC

(57) ABSTRACT

An adjustable flow control device is provided which has a valve body containing a series of orifices of varying diameter and an indexable valve cover which includes at least one flow conduit which can be positioned and locked in a sealable manner over a chosen orifice while the remaining part of the valve cover closes off the other orifices of the valve body. Due to the device having fixed size orifices, each orifice will provide a fixed specific fluid flow rate for any predetermined pressure loss across the orifice. The device is suitable for use on all types of gas and liquid fluids.

20 Claims, 4 Drawing Sheets

(56) References Cited

U.S. PATENT DOCUMENTS

| | | | |
|---|---|---|---|
| 5,308,040 A * | 5/1994 | Torres | F16K 3/085 |
| | | | 137/269 |
| 7,824,472 B2 * | 11/2010 | Urakami | B01D 53/053 |
| | | | 95/100 |
| 8,262,784 B2 | 9/2012 | Walker et al. | |
| 2005/0247901 A1 | 11/2005 | Wang | |
| 2008/0066818 A1 | 3/2008 | Nicolini | |

FOREIGN PATENT DOCUMENTS

| | | |
|---|---|---|
| EP | 2205339 A1 | 7/2010 |
| FR | 2970538 A1 | 7/2012 |
| GB | 2454222 A | 5/2009 |
| WO | 2007135237 A1 | 11/2007 |

\* cited by examiner

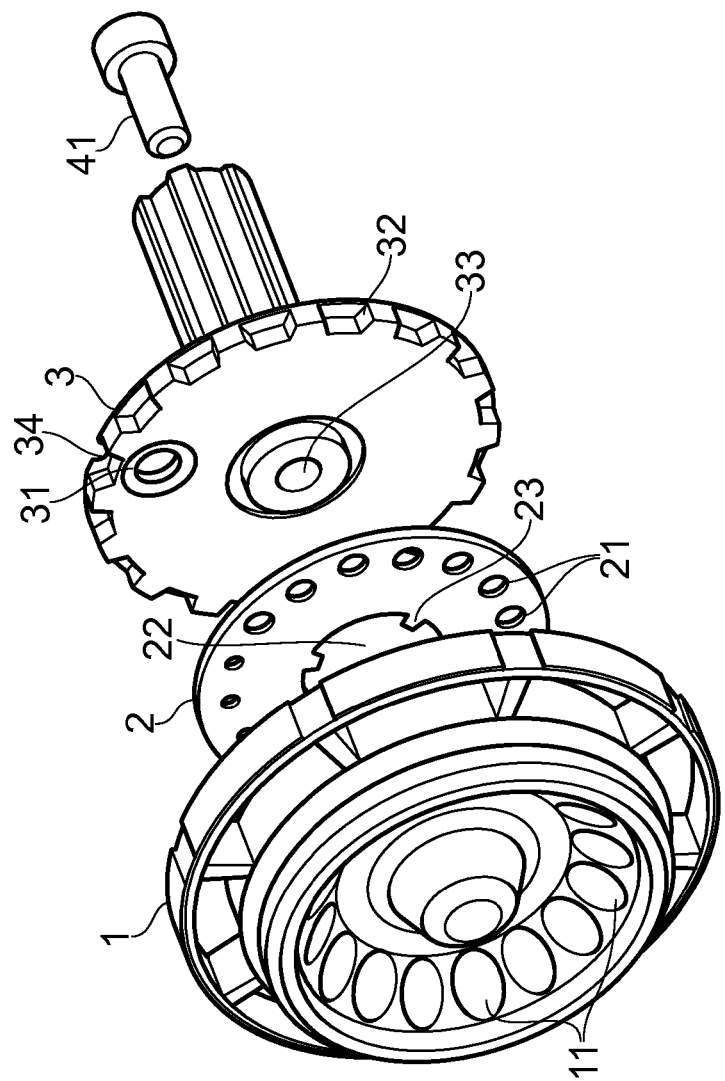
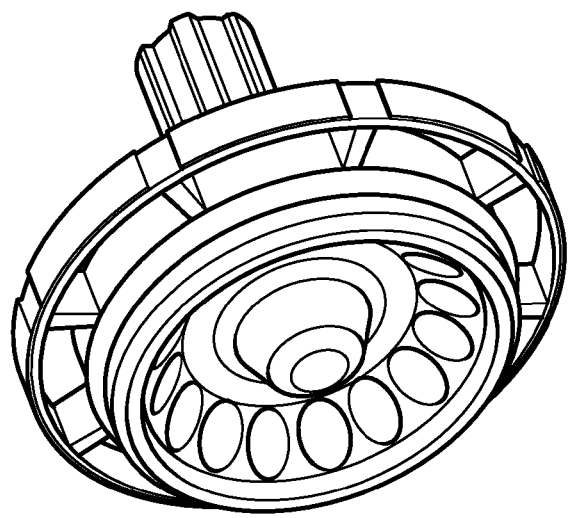
FIG. 1b
FIG. 1a

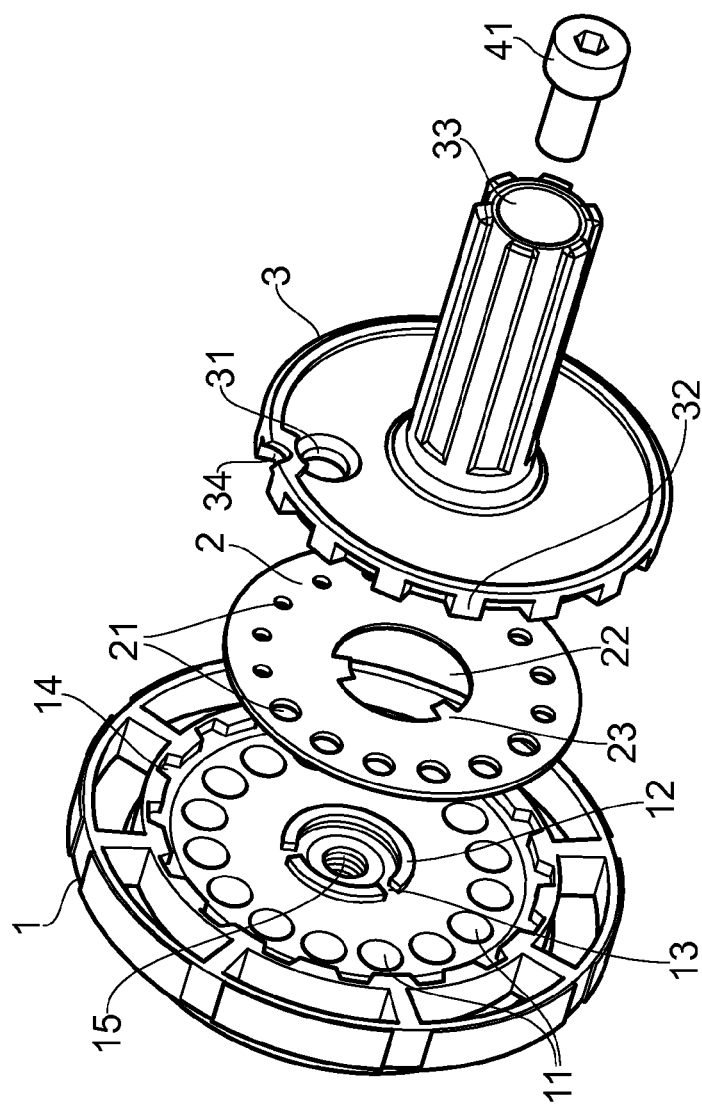
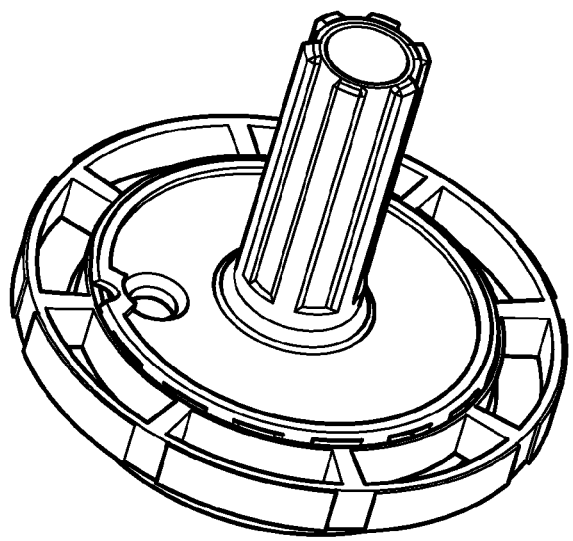
FIG. 2b
FIG. 2a

FLOW CONTROL DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a flow control device. It is particularly, but not exclusively, concerned with an adjustable flow control device which contains a plurality of orifices of varying diameter.

2. Description of Related Art Including Information Disclosed Under 37 CFR 1.97 and 37 CFR 1.98

There are many applications in the air and gas industry where a dependable and constant flow of air or gas is required. In particular, for twin tower pressure swing devices as used for compressed air drying and gas generation, a fixed orifice valve is particularly useful. An inherent part of such pressure swing devices is the use of a purge or re-generating stream of compressed air or gas from the high pressure 'on-stream' tower to the low pressure regenerating 'off-stream' tower. In all cases this purge air or gas effectively re-conditions the sorbent in the 'off-stream' tower.

The design of control valve arrangements on pressure swing devices varies considerably but in its simplest form, the tower switching is typically done using two shuttle valves and two exhaust valves which have proved both cost effective and extremely reliable. A variation on this valve arrangement is to use a shuttle valve for switching the inlet flow from one tower to the other and using two non-return valves for controlling the outlet flow of each tower. Non-return valves have the advantage of providing a means to prevent back flow through the pressure swing device which can cause severe damage to the sorbent. In such configurations the purge flow normally travels through a conduit in a by-pass arrangement circumnavigating the non-return valves however U.S. Pat. No. 8,262,784 and EP 2205339 describe a non-return valve with a single integral fixed orifice. The vast majority of such non-return valves are circular in design and are spring loaded in a normally closed position to prevent back-flow. However under normal process flow conditions the pressure differential across the valve forces the valve open to allow the process gas to pass downstream.

The proportion of purge flow to process flow is controlled by either an adjustable variable area flow control valve or a fixed orifice arrangement. Variable area control valves are relatively expensive and require a flow meter to set the correct proportion of purge flow furthermore they can be easily tampered with by unskilled operators causing the drier to work inefficiently. Although the use of fixed orifice valves is extremely useful and cost effective they also have a significant problem in that the orifice size is normally pre-set at the factory in line with a pre-ordered specification, and cannot easily be changed on site as generally a replacement serviceable component is required. Pressure swing devices have many variables affecting the required purge flow rate, for instance: change in pressure or temperature, change in process flow, change of required dew point, change of generated gas quality (i.e. purity of generated gas) and even change of altitude. It would therefore be extremely useful to have an adjustable flow control valve which could be easily and precisely adjusted to suit the conditions on-site.

One object of the present invention is to address the above problem.

BRIEF SUMMARY OF THE INVENTION

At their broadest, the flow control devices of the present invention contain a plurality of orifices of different sizes such that the flow rate of gas/liquid through the device can be selectively controlled.

A first aspect of the present invention provides a flow control device having a first element and a second element, wherein: the first element has a plurality of first orifices each of a predetermined cross-section; and the second element has a second orifice, and wherein the first and second elements are selectively and sealingly engagable in a plurality of positions, in each of said positions the second orifice being aligned with a different one of said first orifices so as to permit fluid communication through the device via said second orifice and the selected first orifice.

In the flow control device of this aspect, the plurality of first orifices each provide a fixed specific fluid flow rate for any predetermined pressure loss across the orifice.

Preferably the plurality of first orifices are each of a different cross-section.

Preferably the second orifice can be positioned and locked in a sealable manner over a chosen first orifice whilst the remaining part of the second element closes off the other first orifices.

The flow control device can be used on all types of gas and liquid fluids.

By using a device with selectable fixed orifices instead of a single variable area valve, the flow rate for each selected orifice is pre-set, whereas variable area valves need flow meters and fine adjustment to set a specific flow rate.

Preferably the second orifice has a cross-section which is greater than that of each of said first orifices.

Preferably the flow control device also has a third element, wherein the first element is mounted to the third element in a predetermined arrangement and the third element and the second element cooperate to seal the first element between them.

In this configuration, the first element may be a disc having the plurality of first orifices, whilst the second and third elements are a valve cover and body respectively. The disc can then be mounted in the valve body and the valve cover connected to the valve body so as to align the second orifice with the selected first orifice.

This configuration provides for the ability to easily interchange discs. This can be especially useful where large numbers of orifices need to be provided as they can be split between two or more discs. The disc can be sealed with the valve body and cover by using suitable gaskets or bonding with a suitable sealant or simply over moulding the disc to the body or cover.

The first element may be rotationally fixed relative to either the second element or the third element and the second element and third element may each have a plurality of splines equal to the number of first orifices, so that the second element and third element can be selectively engaged in a plurality of positions, each corresponding to the alignment of said second orifice with a different one of said first orifices. By providing the splines, which may include a female recessed portion on one element and a male hub portion on the other, the second and third elements are constrained to only engage in configurations in which the second orifice is aligned with a first orifice. This reduces or removes the need for accuracy by the user in ensuring that the orifices are aligned and/or reduces or removes the possibility that the elements are connected in a manner in which the orifices are not aligned.

Alternatively, the first element may have a location tab and the second element or the third element may have a plurality of tab locators equal to the number of first orifices, so that the first element can be selectively engaged in a plurality of positions, each corresponding to the alignment of said second orifice with a different one of said first orifices. The location tab and tab locators constrained the first and second elements to only engage in configurations in which the second orifice is aligned with a first orifice. This reduces or removes the need for accuracy by the user in ensuring that the orifices are aligned and/or reduces or removes the possibility that the elements are connected in a manner in which the orifices are not aligned. The tabs and/or tab locators may have labelling, e.g. as described further below, to indicate the first orifice which is aligned with the second orifice.

In the case of a non-return valve the third element may include a plurality of third orifices each of which aligns with a corresponding one of said first orifices. Thus the first element can be seated securely on the third element so that fluid passing through the selected first orifice passes through the corresponding orifice in the third element. If only a single orifice (or a number of orifices less than the number of first orifices) is provided in the third element, a flow path from the selected first orifice to the orifice(s) in the third element will need to be provided.

The first element may also incorporate a sector in which there is no orifice (where one would ordinarily be positioned). The selection of this position would effectively shut off and prevent flow through the device, which can be useful for diagnostic or testing purposes.

Preferably the plurality of first orifices are circular and are located with each of their centres equidistant from the centre of the first element. This is termed common PCD (pitch circle diameter). If the first element is circular, then the first orifices can be positioned with each of their centres set at the same radial displacement from the centre of the disc. However, it is not essential to have the orifices around a given PCD particularly when a combination of both large and small orifices are used provided that the engagement spline always corresponds with the orifice placement.

Preferably a seal is located around the second orifice to ensure that, in use, the first orifice is fluid sealed to the second orifice. This will avoid any leakage around the connection between the first and second orifices.

The flow control device may further include an alphanumeric register aligned with each of said first orifices, so that the selected first orifice can be identified, e.g. by a user.

Preferably the alphanumeric register is provided on the outside of the device so that it can be consulted by a user to determine which orifice is selected without the need to take the device apart. Alternatively one of the elements not bearing the alphanumeric register may be provided with a notch which allows one entry in said register to be observed, so that the changing alignment of the register with that element causes a different entry in the register to be visible.

The flow control device may further include a filtering device positioned upstream of said second orifice (or on either or both sides of the second orifice). The filtering device can thus prevent the orifice from being blocked by foreign matter.

Preferably the first element is metallic with the orifices produced by laser cutting.

Producing a series of accurate orifices can be problematic and time consuming especially when there are a large number of differently-sized orifices. If the first element is made of metal then an option is to drill the orifices. However, as each orifice is of a different size this would require many tool changes all of which takes time. The first element could be made from plastic, in which case it is possible to mould the part with different size orifices in one shot but plastic moulding can also be problematic with worn tools producing flash or inaccurate holes due to processing parameters or tool wear over a period of time.

Laser machining is quick and can produce extremely accurately dimensioned orifices. The laser machining may also be used to create other features on the first element, for example to allow for connection with the third element (if present).

In certain embodiments, the first element may be metallic and have one or more locating elements laser cut to ensure correct orientation of the first element to the second or third element. The locating elements may be designed to ensure the correct location no matter which orientation the first element is engaged with the other elements, thereby providing a "poka-yoke" system.

The flow control device may also act as a non-return valve. This allows the flow control device to be used in configurations where reverse flow through the device would be disadvantageous or even dangerous.

The device of the present aspect may include any combination of some, all or none of the above described preferred and optional features.

A second aspect of the present invention provides a pressure swing device including two towers in fluid communication with each other and at least one flow control device according to the above first aspect, including any combination of some, all or none of the preferred and optional features of that aspect for controlling the fluid flow between said towers in at least one direction.

Pressure swing devices have many variables affecting the required purge flow rate, for instance: changes in pressure or temperature, changes in process flow, changes of required dew point, changes of generated gas quality (i.e. purity of generated gas) and even changes of altitude. As the pressure swing device of this aspect has a flow control device which is adjustable between a range of different known flow rates, the flow between the towers can be easily adjusted to suit the conditions on-site.

A third aspect of the present invention provides a pressurised gas or fluid system including a flow control device according to the above first aspect, including any combination of some, all or none of the preferred and optional features of that aspect.

A fourth aspect of the present invention provides a desiccant or other sorption cartridge for use within a pressure swing device incorporating a flow control device according to the above first aspect controlling the fluid flow to or from the cartridge in at least one direction.

BRIEF DESCRIPTION OF THE SEVERAL VIEWS OF THE DRAWINGS

Embodiments of the invention will now be described by way of example with reference to the accompanying drawings in which:

FIG. 1a shows a flow control device according to an embodiment of the present invention;

FIG. 1b shows the flow control device of FIG. 1a in exploded form;

FIG. 2a shows the flow control device of FIG. 1a from the rear;

FIG. 2b shows the flow control device of FIG. 2a in exploded form.

DETAILED DESCRIPTION OF THE INVENTION

Figure 3:
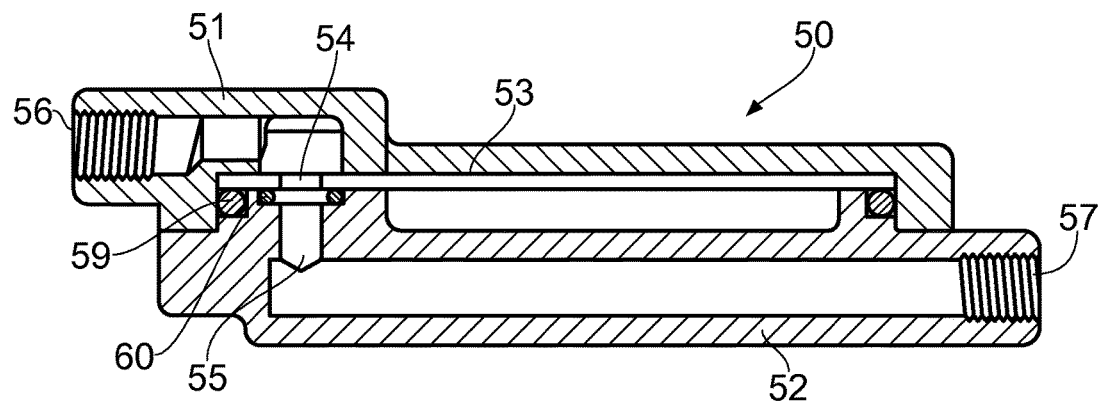
FIG. 3 shows a cross section through a valve according to a further embodiment of the present invention.

A first embodiment of the flow control device is a valve consisting of three parts: a valve body 1, a circular orifice plate 2 and a circular valve cover 3 as shown in FIGS. 1 and 2.

The orifice plate 2 is a circular disc with a series of various diameter orifices 21 positioned around a common PCD (pitch circle diameter), i.e. with each of their centres set at the same radial displacement from the centre of the disc. The diameters of these orifices 21 are known and recorded.

The orifice plate 2 has a central circular hole 22 with two locating pins 23 which engage with notches 13 in a locating ring 12 on the body 1 to position the orifice plate 2 both centrally and rotationally with respect to the body 1. A different number of locating pins 23 could be used to the same effect, or the shape of the central hole could be selected to match a similarly shaped protrusion or recess on the body 1. Preferably the locating pins or other means of locating do not have rotational symmetry so that the orifice plate 2 can only be located in a single orientation with respect to the body 1. Furthermore, the locating pins 23 are designed to ensure the correct location no matter which orientation the orifice plate 2 is fitted to the valve body 1, thereby providing a "poka-yoke" system.

The body 1 has a plurality of orifices 11 which match in number to the orifices 21 in the orifice plate 2. Towards the centre of the internal face of the body, a locating ring 12 is provided which protrudes slightly from the face. This locating ring 12 matches to the central circular hole 22 of the orifice plate, thereby locating and retaining the orifice plate in relation to the body 1. The locating ring 12 has two notches 13 which engage with the locating pins 23 on the orifice plate to retain the orifice plate in a fixed rotational position relative to the body and thereby ensure that the orifices 11 in the body 1 are aligned with the orifices 21 in the orifice plate 2.

The body 1 has a circular recessed female splined hole 14 around the outer circumference of the internal face for engagement with the valve cover 3. The number of splines is equal to the number of orifices 21 in the orifice plate 2.

In the centre of the internal face of the body 1 is a fixing means 15, such as the blank female threaded hole shown in FIG. 2b. This allows the orifice plate 2 and valve cover 3 to be fixed to the body 1 and a fluid-tight seal made.

Advantageously the body has an alphabetical or numerical register aligned with the series of orifices 11 which can be cross referenced against a table of known performance characteristics to ensure the correct orifice 21 is used for each application. This register could be printed, inscribed or moulded on the outer circumference of the body 1 and aligned with each spline of the hole 14. The register can be observed through a notch 34 to ensure correct positioning.

The valve cover 3 is typically of the same diameter as the internal face of the valve body 1 and has a single orifice 31. The orifice 31 is at least equal to, or larger in diameter than the largest diameter orifice 21 in the orifice plate 2 and is located on the same PCD as the orifices 21 in the orifice plate 2.

The cover 3 has around its circumference a circular male splined boss 32 dimensioned to fit the splines 14 in the valve body 1. The interaction between the boss 32 and the splines 14 rotationally fixes the cover 3 and the body 1 relative to each other, thereby fixing the position of the orifice 31 in the cover 3 relative to the orifices 21 in the orifice plate 2.

In the centre of the cover 3 is a through hole 33 through which the locking device 41 passes to engage with the fixing means 15. The locking device 41 is typically in the form of a bolt which engages with the threaded hole 15 in the body and bears against the cover 2 to hold the two parts together in use.

The single orifice 31 in the valve cover 3 may be provided with a filtering device on the upstream side to prevent the orifice 31 from being blocked by foreign matter.

The various parts of the device can be manufactured from plastic or metal depending on the application requirements.

The orifice shape of all of the orifices 11, 21, 31 can take any form such as square, oval, hexagonal etc. but for sake of practicality a circular round orifice is preferred. It is also preferable that the orifices are all of the same cross-sectional shape to avoid or reduce the turbulent flow associated with movement of the fluid past orifices of different shapes.

Producing a series of accurate orifices can also be problematic and time consuming especially when the orifice plate 2 may have twenty or more differently-sized orifices 21. If the orifice plate 2 is made of metal then it is normal to drill orifices. However, as each orifice 21 is of a different size this would require many tool changes all of which takes time. If the orifice plate 2 is made from plastic then it is possible to mould the part with different size orifices 21 in one shot but plastic moulding can also be problematic with worn tools producing flash or inaccurate holes due to processing parameters or tool wear over a period of time, etc.

In the present embodiment these problems are addressed by the orifice plate 2, which is a pre-holed annular disc sandwiched between the valve body 1 and valve cover 3. The orifice plate 2 can be made from plastic but is preferably made from a corrosion resistant metal such as brass or preferably stainless steel.

Such discs can be pressed, water jet cut or laser cut from sheet steel. Advances in water jet and laser cutting technology lends itself to producing such discs and when the orifices are cut in this way, it is quick, extremely accurate and cost effective especially with today's computer controlled machines. At the same time as producing the series of orifices the cutting machine can also cut female registering locations 22, 23 which will coincide with male registering locations 12, 13 in the valve body 1. These registering locations ensure the orifice plate 2 is always located in the correct position. Another feature of these techniques is the ability to etch meaning that all manner of identification markings can be added to the disc, such as part numbers or the register information to allow a user to identify which size of orifice is in use.

Whilst it is possible to position the orifice plate 2 on the high pressure or low pressure side of the valve body 1, it is preferable to position it on the high pressure side as the differential pressure will help aid the orifice plate 2 seal against the valve body 1.

The orifice plate 2 may be interchangeable. This is especially useful when large numbers of orifices 21 need to be used as they can be split between two or more orifice plates 2. Of course the orifice plate 2 needs to seal with the valve body 1 and cover 3 and this can be done by using suitable gaskets or bonding with a suitable sealant or simply over moulding the disc to the body or cover.

Many empirical formulas have been devised over the years to estimate or predict the anticipated flow rate through an orifice which is an accurate sharp edged circular hole. Therefore by inputting the application specific data, typically fluid type and differential pressure, then the flow rate can be closely approximated. This allows the user of the flow control device to select the orifice with the desired flow characteristics based on the size of the selected orifice (which can be determined from the register information) and the application specific data.

The embodiment described above relates to a non-moving valve which would normally be held and sealed within a pressure containing receptacle, for example within a pressure swing device, and would have both inlet and outlet conduits. Other embodiments of the present invention provide a pressure swing device incorporating one or more flow control devices according to embodiments of the present invention.

In a pressure swing compressed air drier, the inlet would provide high pressure dry air from the 'on stream' tower and the outlet would provide extra dry air to the 'off stream' regenerating tower.

In a further embodiment, the adjustable flow control valve and a non-return valve are combined to provide a dual function valve which provides a means to prevent back flow through the pressure swing device (which can cause severe damage to the sorbent). Function one is when the valve is closed and in this mode it provides a means for controlled purge flow and in function two the valve is open providing unrestricted process gas flow to the outlet port of the device.

The non-return valve may be of any known construction, but are typically circular in design and are spring loaded in a normally closed position to prevent back-flow. However under normal process flow conditions the pressure differential across the valve forces the valve open to allow the process gas to pass downstream.

Figure 4:
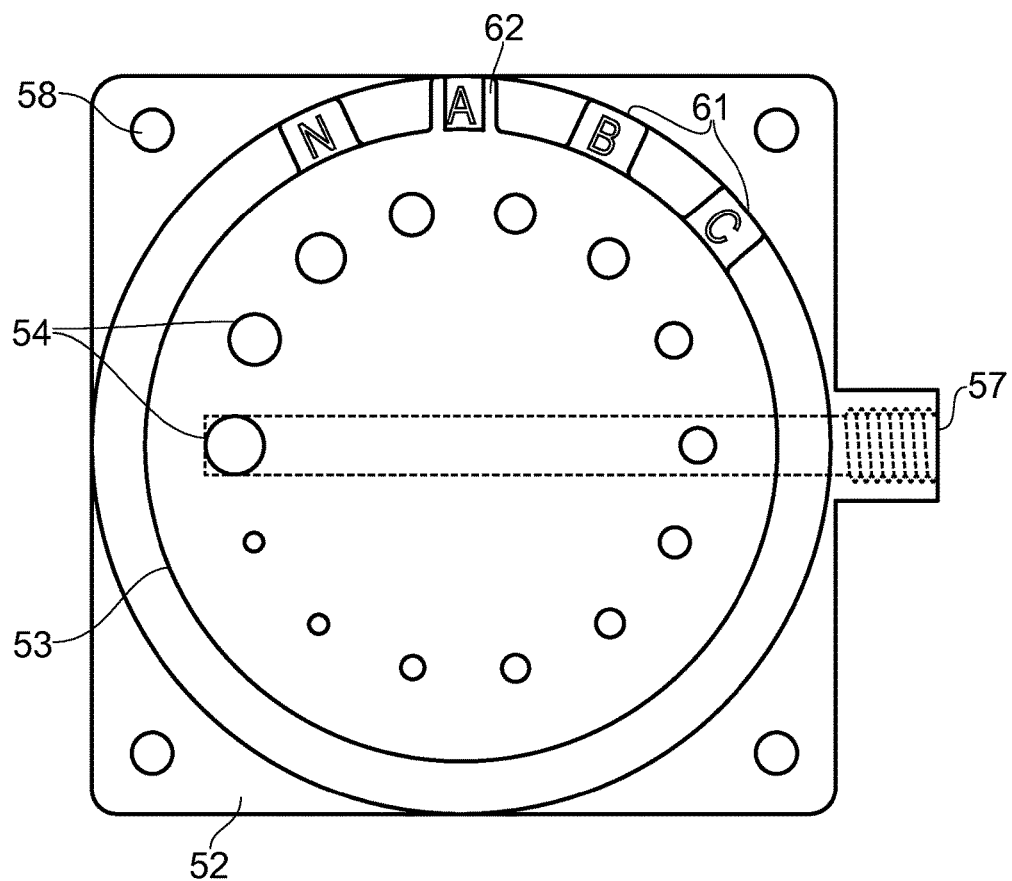
FIG. 4 shows a sectional view taken along the line A-A of the valve in FIG. 3.

FIG. 3 shows a three-part in-line variable purge valve 50 according to a second embodiment of the present invention (although the valve shown is a purge valve, it will be appreciated that valves for other purposes can be made to the same or similar construction). This valve permits purge flow in either direction. FIG. 4 shows a cross-section along the line A-A in FIG. 3.

The valve 50 is made up of three primary components: a first manifold 51, a second manifold 52 and a disc 53 which is sandwiched between the two manifolds.

The first manifold 51 has a first port 56 which, in use, is in fluid communication with one of the towers of the pressure swing device. The second manifold 52 has a second port 57 which, in use, is in fluid communication with the other of the towers of the pressure swing device.

The disc 53 is sandwiched between the two manifolds 51, 52 which are bolted together using a standard 4 bolt flange fixing. Bolts pass through holes 58 in the manifolds and the two manifolds are secured together with an O-ring seal 59 around the disc 53.

The disc 53 has a number of circular orifices 54 cut around a common pitch circle diameter, each having a different, known radius. The disc is mounted in one of a number of predetermined rotational positions on the second manifold 52 as viewed in FIG. 4 which are arranged such that, in each of the predetermined positions, one of the orifices 54 on the disc is positioned in-line with a single orifice 55 in the second manifold 52. The single orifice 55 in the second manifold 52 has a greater diameter than all of the orifices 54 cut into the disc 53. The single orifice 55 may have its own O-ring seal 60 which ensures a fluid-tight seal between the disc 53 and the second manifold 52.

The first port 56 is in fluid communication with the selected orifice 54 in the disc 53. The orifice 55 in the second manifold is in fluid communication with the second port 57. Accordingly, fluid can flow from the first port to the second port (or vice-versa) through the selected orifice 54 in the disc 53, and the rate of flow will be determined by the diameter of the selected orifice 54 and can be readily determined from known information about the diameter of the selected orifice 54 and the properties of the fluid.

As shown in FIG. 4, the second manifold 52 has a plurality of tabs 61, each bearing an alphanumeric reference. The number of tabs 61 matches the number of orifices 54 cut into the disc 53. The disc 53 has an indicator 62 which, when the disc 53 is aligned such that one of the orifices 54 is aligned with the orifice 55 in the second manifold, aligns with one of said tabs 61. Therefore a user of the valve 50 can easily determine which orifice 54 is in use and, from a reference table or other source, information about that orifice.

Either due to the interaction between the tabs 61 and the indicator 62, or through a separate set of mutually engaging portions, the disc 53 is constrained to only be positioned in a fixed number of rotary positions relative to the second manifold. This number of positions corresponds to the number of orifices 54 in the disc 53, such that in each position a different one of said orifices aligns with the orifice 55 in the second manifold.

It will be appreciated that, where components of this embodiment have not been described in detail, they may have similar properties, functions or characteristics (including any optional properties, functions or characteristics) as described in relation to similar components of the above described first embodiment.

Figure 5:
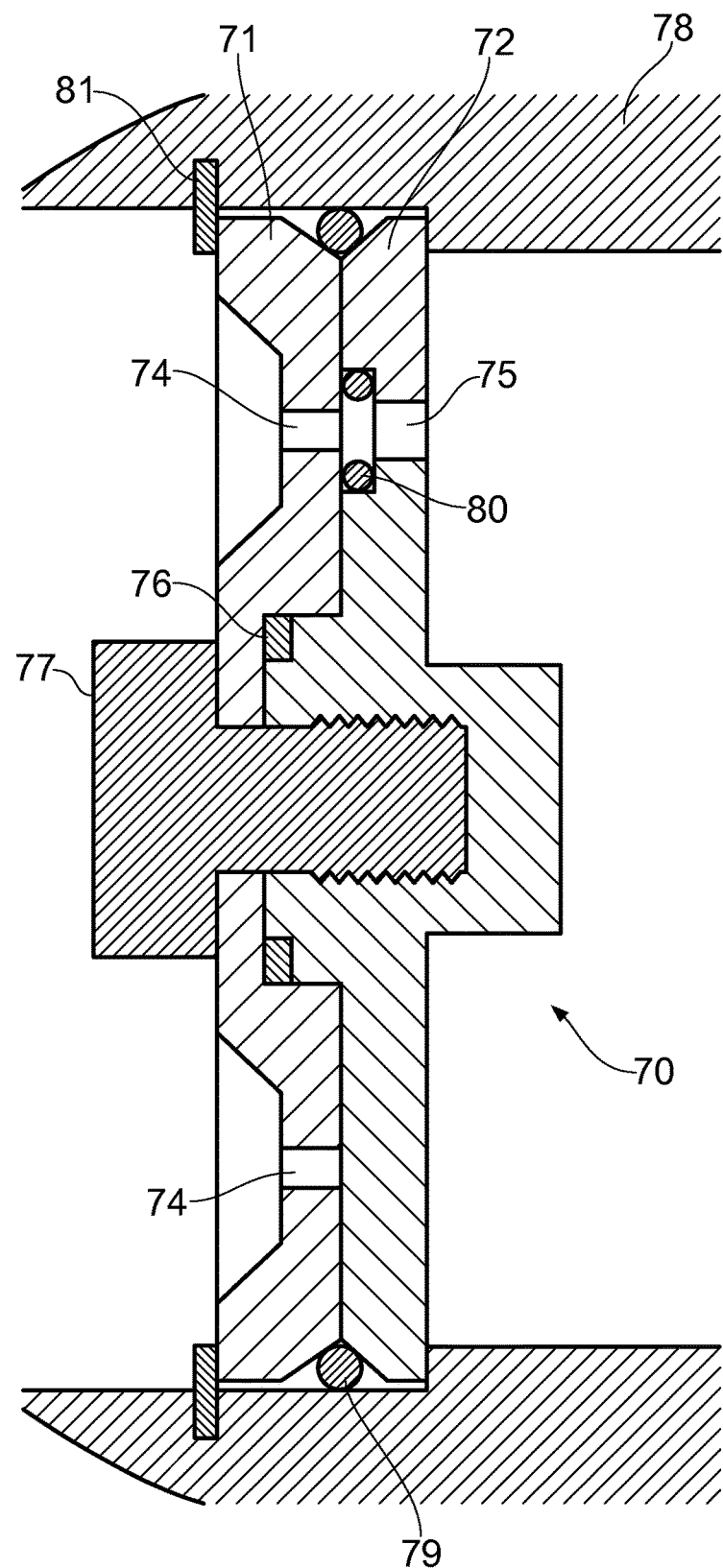
FIG. 5 shows a section view through a valve according to a further embodiment of the present invention.

FIG. 5 shows a cross-section through a valve 70 according to a further embodiment of the present invention. In contrast to the above described embodiments in which the valve was comprised of three principal components, the valve 70 of this embodiment has two principal components: a first plate 71 and a second plate 72.

The first element 71 has a number of circular orifices 74 cut around a common pitch circle diameter, each having a different, known radius. The first element 71 is mounted to the second element 72 in one of a number of predetermined rotational positions which are arranged such that, in each of the predetermined positions, one of the orifices 74 on the disc is positioned in-line with a single orifice 75 in the second element 72. The single orifice 75 in the second element 72 has a greater diameter than all of the orifices 74 cut into the first element 71. The single orifice 75 may have its own O-ring seal 80 which ensures a fluid-tight seal between the first element 71 and the second element 72.

The rotational position of the first element 71 relative to the second element 72 is controlled to be in one of the number of predetermined positions by spline locators 76. The first element 71 is secured to the second element 72 by a fixing bolt 77 so that the O-ring seal 80 of the single orifice makes a fluid-tight seal between the elements.

The valve 70 can be mounted in a pipe 78 or other fluid containing component and fluid flow around the valve is prevented by an outer O-ring seal 79. A circlip 81 is used to hold the valve 70 in position.

It will be appreciated that, where components of this embodiment have not been described in detail, they may have similar properties, functions or characteristics (including any optional properties, functions or characteristics) as described in relation to similar components of the above described first and second embodiments.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. A flow control device comprising:
a first element having a plurality of first orifices each having a predetermined cross-section;
a second element having a second orifice, said first and second elements being selectively and sealingly engageable in a plurality of positions in which in each of the plurality of positions of said second orifice is aligned with a different one of said plurality of first orifices so as to permit fluid communication through the flow control device via said second orifice and the selected first orifice;
a third element to which said first element is mounted in a predetermined arrangement, said third element and said second element cooperating so as to seal said first element therebetween, said second element and said third element each having a plurality of splines equal to a total number of said plurality of first orifices such that said second element and said third element can be selectively engaged in a plurality of positions each corresponding to the alignment of said second orifice with the different one of said plurality of first orifices.

2. The flow control device of claim 1, said plurality of first orifices each having a different cross-section.

3. A flow control device comprising:
a first element having a plurality of first orifices each having a predetermined cross-section;
a second element having a second orifice, said first and second elements being selectively and sealingly engageable in a plurality of positions in which in each of the plurality of positions of said second orifice is aligned with a different one of said plurality of first orifices so as to permit fluid communication through the flow control device via said second orifice and the selected first orifice;
a third element to which said first element is mounted in a predetermined arrangement, said third element and said second element cooperating so as to seal said first element therebetween, said first element having a location tab, said second element or said third element having a plurality of locator tabs equal to a total number of said plurality of first orifices such that said first element can be selectively engaged in a plurality of positions each corresponding to the alignment of said second orifice with the different one of said plurality of first orifices.

4. A flow control device comprising:
a first element having a plurality of first orifices each having a predetermined cross-section;
a second element having a second orifice, said first and second elements being selectively and sealingly engageable in a plurality of positions in which in each of the plurality of positions of said second orifice is aligned with a different one of said plurality of first orifices so as to permit fluid communication through the flow control device via said second orifice and the selected first orifice;
a third element to which said first element is mounted in a predetermined arrangement, said third element and said second element cooperating so as to seal said first element therebetween, said third element having a plurality of third orifices each of which aligns with a corresponding one of said plurality of first orifices.

5. The flow control device of claim 1, wherein said plurality of first orifices are circular and are located with each of their respective centers equidistant from a center of said first element.

6. The flow control device of claim 1, wherein a seal is located around said second orifice to ensure that, in use, said first orifice is fluid sealed to said second orifice.

7. The flow control device of claim 1, further comprising:
an alphanumeric register aligned with each of said plurality of first orifices so that the selected first orifice can be identified.

8. The flow control device of claim 7, further comprising:
a notch in one of the elements not having said alphanumeric register so as to allow one entry in said alphanumeric register to be observed.

9. The flow control device of claim 1, further comprising:
a filtering device positioned on one or both sides of said second orifice.

10. The flow control device of claim 3, said plurality of first orifices each having a different cross-section.

11. The flow control device of claim 3, wherein said plurality of first orifices are circular and are located with each of their respective centers equidistant from a center of said first element.

12. The flow control device of claim 3, wherein a seal is located around said second orifice to ensure that, in use, said first orifice is fluid sealed to said second orifice.

13. The flow control device of claim 3, further comprising:
an alphanumeric register aligned with each of said plurality of first orifices so that the selected first orifice can be identified.

14. The flow control device of claim 13, further comprising:
a notch in one of the elements not having said alphanumeric register so as to allow one entry in said alphanumeric register to be observed.

15. The flow control device of claim 3, further comprising:
a filtering device positioned on one or both sides of said second orifice.

16. The flow control device of claim 4, said plurality of first orifices each having a different cross-section.

17. The flow control device of claim 4, wherein said plurality of first orifices are circular and are located with each of their respective centers equidistant from a center of said first element.

18. The flow control device of claim 4, wherein a seal is located around said second orifice to ensure that, in use, said first orifice is fluid sealed to said second orifice.

19. The flow control device of claim 4, further comprising:
   an alphanumeric register aligned with each of said plurality of first orifices so that the selected first orifice can be identified.

20. The flow control device of claim 4, further comprising:
   a filtering device positioned on one or both sides of said second orifice.

\* \* \* \* \*